United States Patent [19]

McJones

[11] 3,718,046
[45] Feb. 27, 1973

[54] PRESSURE GAUGE ISOLATOR

[76] Inventor: Robert W. McJones, 529 Via Del Monte, Palos Verdes Estates, Calif. 90274

[22] Filed: Oct. 8, 1970

[21] Appl. No.: 79,063

[52] U.S. Cl. ................................................73/395
[51] Int. Cl. ..............................................G01l 19/06
[58] Field of Search ..............................73/395, 419

[56] References Cited

UNITED STATES PATENTS

| | | | |
|---|---|---|---|
| 1,828,093 | 10/1933 | Ailman | 73/395 |
| 3,102,427 | 9/1963 | Trostel | 73/395 X |
| 3,415,123 | 12/1968 | Broughton | 73/395 |

FOREIGN PATENTS OR APPLICATIONS

| | | | |
|---|---|---|---|
| 4,037 | 3/1891 | Great Britain | 73/395 |

Primary Examiner—Donald O. Woodiel
Attorney—Christie, Parker & Hale

[57] ABSTRACT

A pressure gauge isolator employs a tube or line between the pressure gauge and a source of pressure. A translatable piston or plug is disposed within the line between two constrictions. The first constriction prevents the plug from entering the system which comprises the source of pressure. The second constriction prevents the plug from passing beyond the constriction to prevent excessive pressurization of the gauge and to positively prevent the fluid of the pressure source from reaching the gauge. The plug or piston has a first end in sealing engagement with the inner wall of the tube and facing the pressure source. A second end of the plug has a diameter to provide a slight clearance between it and the inner wall of the tube. The plug is made of resilient material such as rubber.

6 Claims, 2 Drawing Figures

PATENTED FEB 27 1973 3,718,046

INVENTOR.
ROBERT W. McJONES

BY
Christie, Parker & Hale
ATTORNEYS

3,718,046

PRESSURE GAUGE ISOLATOR

BACKGROUND OF THE INVENTION

The present invention relates to gauge isolators. Gauge isolators have been used in the past to isolate a gauge from the pressure source the gauge reads. This is done not only to protect the gauge but also to protect personnel in the vicinity of the gauge from being exposed to a potentially hazardous condition. For example, if a pressure gauge for sensing a flammable gas were in direct pressure communication with a source of pressure and the pressure gauge failed, the gas from the source of pressure would escape through the gauge and create a dangerous condition. If the gas were under considerable pressure, the additional hazard of an exploding gauge would be present.

The prior art gauge pressure isolators are generally classified into diaphragm or piston types. These types of gauge isolators are bulky and expensive.

There is a need, therefore, for a pressure gauge isolator which is economical and does not occupy a large amount of space.

SUMMARY OF THE INVENTION

The present invention provides a gauge isolator which employs the line or tube between a source of pressure and the gauge.

More specifically, the present invention provides a gauge isolator having a plug or piston disposed in the line or tube leading from a pressure source to the gauge. This piston is free to travel back and forth in the tube in response to pressure variations at the pressure source. A stop in the tube between the piston and the gauge cooperates with the piston to provide a seal which prevents excessive pressure from reaching the gauge to avoid a possible catastrophic failure of the gauge or an uncontrolled flow of fluid through a broken gauge. Preferably, a second stop in the line between the pressure source and the piston is provided to prevent the piston from being discharged into the system constituting the pressure source when the pressure between the gauge and the piston exceeds that at the pressure source. In addition, this second stop is useful in the preferred form of the present invention which employs a relatively viscous fluid such as grease between the piston and the pressure gauge to prevent the viscous fluid from passing into the system constituting the pressure source.

In its preferred form the piston of the present invention is made of a resilient material such as rubber and has a first end facing the pressure source which is in sealing engagement with the inner wall of the tubing in which the piston is disposed. The periphery of the piston has a circumference which gets progressively smaller away from this first end to an intermediate point where again the circumference begins to increase to the second end of the piston. However, the second end of the piston has a circumference which provides a slight clearance between it and the inner wall of the tubing. The first end of the piston is concave or dishshaped to present a thin wall section or lip between the piston and the inner wall. Pressure from the pressure source, then, will urge the thin wall section radially outward to effect a seal. Conversely, in the event that fluid from the pressure source should pass the piston and get into the line between the piston and the pressure gauge, it is possible for this fluid to pass back to the pressure source when the gauge pressure exceeds that of the pressure source by forcing the thin wall section into a smaller diameter and creating a passage for the fluid to pass the piston.

The present invention, then, provides a very cheap and compact pressure gauge isolator. The tubing which is used to couple the gauge to a pressure source is also employed as part of the gauge isolator. A piston and a stop in the tubing provide the actual gauge isolation and thus no more space is required by the pressure gauge isolator than that required without it. In its preferred form, the piston of the present invention provides a means for preventing fluid from the pressure source from passing between the piston and the gauge, but in the event that such fluid does pass the piston, it provides a means for the fluid to get back to the pressure source side of the piston. The viscous fluid employed in the preferred form of the present invention makes it exceedingly easy to install the pressure gauge isolator in, for example, a motor vehicle. This is so because the fluid does not have a tendency to run out of the tubing. In its preferred form, the stop between the gauge and the piston is positioned such that the piston reaches the stop at the maximum pressure setting of the gauge and, as a consequence, there is no danger of gauge failure when an excessive pressure condition exists at the pressure source.

These and other features, aspects and advantages of the present invention will become more apparent from the following description, appended claims and drawings.

DESCRIPTION OF THE PREFERRED EMBODIMENTS

Figure 1:
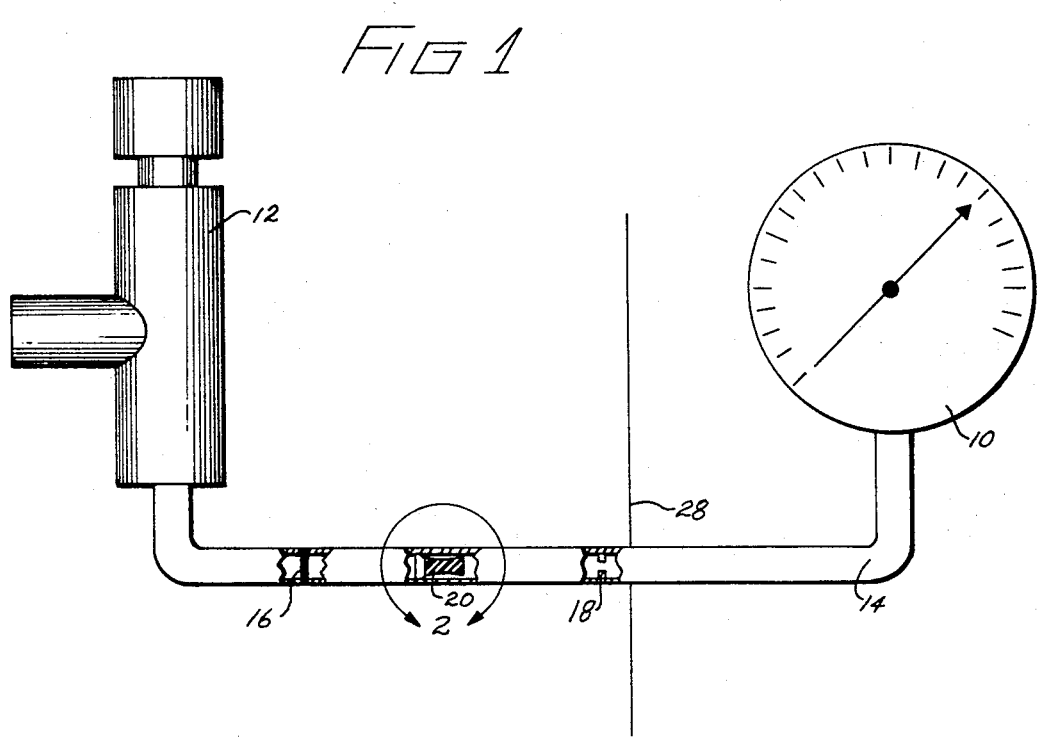
FIG. 1 is a schematic view of a preferred form of the gauge isolator of the present invention.

With reference to FIG. 1, a gauge 10 is pressure coupled to a source of pressure 12 through a line 14. The line, which may be in the form of tubing, has a first and a second stop indicated by reference numerals 16 and 18, respectively. A piston or plug 20 is disposed between these stops and is free to move between them in response to the pressure at the pressure source.

The piston is preferably made of a resilient material such as rubber. Between the piston and the gauge, line 14 is filled with a viscous fluid such as grease. This facilitates the installation of the pressure gauge isolator because the viscous fluid cannot readily escape from the tubing. The first stop prevents the piston from entering the system constituting the pressure source and, as a consequence, prevents the viscous fluid from entering the system. The second stop cooperates with the piston when the piston abuts it to provide a positive seal so that fluid from the pressure source cannot pass into the gauge. As a consequence, when an excessive pressure condition exists at the pressure source there is no possibility that fluid at the pressure source will pass into the gauge to break it and to pass from the gauge.

The stops may be in the form of orifices in the line, or in the case of stop 16, in the form of a pin disposed diagonally across the line. This pin admits to fluid passage past the piston from the gauge side to the pressure side when the pressure on the gauge side is higher than on the pressure source side of the piston by breaking the seal between the piston and the inner wall of the line.

Figure 2:
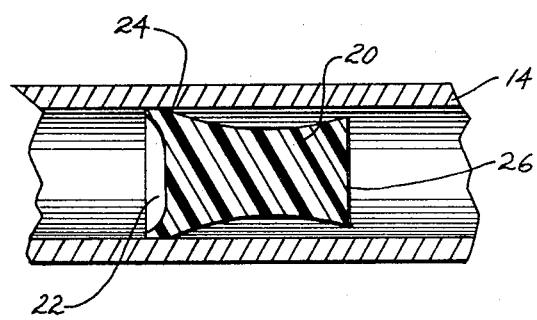
FIG. 2 is a view in half section taken in the area embraced by line 2—2 in FIG. 1.

With reference to FIG. 2, the configuration of the piston and its cooperation with the tubing are illustrated in greater detail. The piston has a first end 22 which faces the pressure source. This first end is normally in interference engagement with the inner wall of the tubing. The end also has a concave shape to present an annular lip-like thin wall portion 24 in contact with the inner wall of the tubing. As a consequence, pressure on the pressure source side will urge radially against the annular lip to augment the seal effected by an interference engagement between the lip and the wall. Axially of the first end, the piston progressively narrows and then increases in diameter to a second end 26. The second end has a diameter which is slightly less than the inner diameter of the tubing to provide a slight clearance. But this end's diameter is sufficient to maintain the piston properly oriented in the line by preventing excessive canting of the piston.

The gauge isolator of the present invention is ideally suited for use in motor vehicles equipped to operate on a high pressure gaseous fuel such as natural gas. In such a vehicle the pressure gauge in the cab of the vehicle acts like a normal fuel gauge. Compressed gas, however, may be at a pressure in the vicinity of 2,000 psi. As a consequence, if the gauge failed at this pressure, or, if for some reason as during charging, the system maximum pressure were exceeded, it would be possible for the gauge to fail and to admit gas, which is a flammable, into the cab of a vehicle. Obviously, this hazardous condition is not satisfactory. Moreover, depending on the gauge, it is possible for gas from the pressure source to break the glass of the gauge which could also result in injury.

In FIG. 1 a vertical line 28 represents the fire wall of the vehicle. It should be noted that stop 18 is between the fire wall and the pressure source, typically in the engine compartment of a vehicle, and the pressure gauge is on the passenger side of the vehicle.

In use, piston 20 traverses back and forth in line 14 in response to pressure at the pressure source. As such, it moves the viscous fluid between it and the pressure gauge back and forth in the line and the gauge responds to this movement to mirror the pressure at the pressure source. In the event of an excessive pressure condition, the piston comes into contact with stop 18 and positively blocks any fluid from the pressure source from entering the gauge or from further increasing gauge pressure. In the event that pressure from the pressure source should become relatively low, the piston will be arrested at stop 16 to not only prevent the piston from entering the system constituting the source of pressure but to prevent viscous fluid from passing into the system.

Occasionally, it is possible for fluid such as natural gas to pass the seal between lip 24 and the inner wall of the line and to get on the gauge side of the piston. When this occurs, the gas is purged from the line because the piston abuts stop 16 when the pressure on the gauge side is larger than the pressure on the pressure source side. The excessive pressure on the gauge side will force piston 20 against the pin and allow that portion of lip 24 of the piston which is normal to the axis of the pin to collapse radially inward for the passage of the gas back into the pressure source side of the system. Incidentally, it should be noted that once this gas passes back into the pressure source side of the system, pressure equilibrium will exist across the piston and there will be no tendency for the viscous fluid in line 14 in the gauge side to pass into the pressure source.

The present invention has been described with reference to certain preferred embodiments. The spirit and scope of the appended claims should not, however, necessarily be limited to the foregoing description.

What is claimed is:

1. A pressure gauge isolator comprising:
   a. a line adapted to pressure communicate a pressure gauge with a source of pressure to be sensed;
   b. a piston disposed in the line for movement therein in response to a pressure differential across it, the piston having a first end facing the source of pressure, the first end having an annular, resilient lip in sealing engagement with the inner wall of the line which is the only portion of the piston in sealing engagement with the inner wall of the line;
   c. first stop means between the piston and the pressure gauge to arrest motion of the piston toward the pressure gauge when a predetermined pressure at the source of pressure exists; and
   d. second stop means between the piston and the pressure source to arrest motion of the piston towards the pressure source and permit the lip to collapse slightly from the inner wall of the line and pass fluid from the gauge side of the piston to the pressure source side of the piston.

2. The pressure gauge isolator claimed in claim 1, wherein:
   a viscous fluid is in the line between the piston and the pressure gauge.

3. The pressure gauge isolator claimed in claim 1, wherein the first stop means is disposed in the line at a point corresponding substantially with the maximum pressure capacity of the gauge.

4. The pressure gauge isolator claimed in claim 1 wherein:
   the second stop means includes a pin disposed in the line.

5. The pressure gauge isolator claimed in claim 4 wherein:
   the piston includes a second end having a diameter slightly smaller than the diameter of the inner wall of the line.

6. The pressure gauge isolator claimed in claim 5 wherein:
   a viscous fluid is in the line between the piston and the pressure gauge.

\* \* \* \* \*